United States Patent
Strawn et al.

[15] 3,636,444
[45] Jan. 18, 1972

[54] APPARATUS FOR MEASURING SMALL CHANGES IN CONDITION-SENSITIVE CAPACITANCE TRANSDUCERS

[72] Inventors: Charles F. Strawn, Arlington, Tex.; John C. Donovan, Milwaukee, Wis.

[73] Assignee: Johnson Service Company, Milwaukee, Wis.

[22] Filed: Jan. 30, 1970

[21] Appl. No.: 7,176

[52] U.S. Cl. .......................................................324/61 R
[51] Int. Cl. ..........................................................G01n 27/26
[58] Field of Search ..............................324/60, 61; 73/336.5

[56] References Cited

UNITED STATES PATENTS 2,906,948  9/1959  Shawhan.................................324/60

FOREIGN PATENTS OR APPLICATIONS 121,271  10/1959  U.S.S.R. ..................................324/61
152,026  1/1962   U.S.S.R. ..................................324/60

OTHER PUBLICATIONS

Stout M. B. Maxwell Commutated DC Bridge for Capacitance in Basic Electrical Measurements. Prentice-Hall Inc. N.J. 1950. pp. 233–225 & 235.

Primary Examiner—Edward E. Kubasiewicz
Attorney—Andrus, Sceales, Starke & Sawall

[57] ABSTRACT

A humidity-sensitive capacitance sensor or transducer is connected in one leg of a modified Maxwell commutated DC bridge with the other legs formed of resistors. The sensor continually senses the humidity condition and establishes a proportional output signal of the bridge in accordance with changes in capacitance over a small range on a suitable galvanometer. A crystal-controlled oscillator actuates a pair of transistors to alternately connect the condition-sensitive capacitance transducer in a discharging circuit and in a charging circuit in the bridge network. The capacitance transducer alternately charges and discharges with a null output at a given condition and a proportionate output in response to any deviation of the condition sensed by the capacitance sensor. A span adjustment and a charge reservoir capacitor are employed to facilitate the operation.

14 Claims, 3 Drawing Figures

PATENTED JAN 18 1972

3,636,444

INVENTORS
Charles F. Strawn
John C. Donovan

BY Andrus, Sceales, Starke & Sawall

Attorneys

APPARATUS FOR MEASURING SMALL CHANGES IN CONDITION-SENSITIVE CAPACITANCE TRANSDUCERS

BACKGROUND OF THE INVENTION

This invention relates to the continuous measurement and indication of a varying capacitance and particularly, the varying capacitance produced in a condition-sensitive capacitive sensor or transducer.

A capacitive sensor or transducer may be employed in a sensing or processing system to produce a voltage or current output in accordance with a sensed condition which varies the capacitance of the transducer. For example, a capacitance sensor sensitive to humidity is shown in U.S. Pat. 3,350,941 to Misevich and Sullivan which is particularly adapted to sense and indicate or, through a suitable circuit, control the humidity in a given environment. The capacitance changes in a known manner with the humidity and thereby provides an electrical signal means for actuating of the indicator and/or control system.

The measurement of given capacitance has been accomplished in many ways, including for example, the ballistic method, the AC bridge method, and a Maxwell commutated DC bridge. The ballistic and AC bridge methods generally require sequential operation and subsequent mathematical calculations. The DC bridge generally provides a direct reading through the use of galvanometer means or the like.

The Maxwell commutated DC bridge which is generally similar to the AC bridge system has been essentially a laboratory tool for measuring an unknown capacitor which is stable and invariant during the measurement period of time. The bridge is connected to a DC source and contains a switch which alternately connects the unknown capacitor into the bridge to charge the capacitor from such source and to a discharge circuit to discharge the capacitor. The switch has generally been of a mechanical type driven from either a synchronous motor, a mechanical chopper, or a tuning fork unit and at a frequency which allows the capacitor to be fully or substantially charged and discharged during the respective switching periods.

The Maxwell commutated DC bridge has been employed in the laboratory measurement of a series of unknown capacitors which have essentially no losses, such as air or vacuum capacitors. This restriction has been uniformly placed on the system because of the varying sensitivity to the electrical characteristic exhibited by capacitance with a dielectric which generally has environmental absorption characteristics such as that of the above United States patent.

SUMMARY OF THE INVENTION

This invention relates to a method and circuit for the continuous measurement and indication of a varying capacitance of a condition-sensitive capacitive transducer of the absorption variety such as the capacitive humidity transducer of U.S. Pat. No. 3,350,941 with a modified Maxwell commutated DC bridge-type system or the like, and particularly where the circuit is employed as a part of a monitoring or control system wherein the unbalanced condition is of significance to control further means of the system. The present invention is based on the realization and teaching of the inventors that the electrical characteristic associated with lossy material in a condition-sensitive capacitive element are of a resistive characteristic which can be compensated for by proper circuit design and construction. The resistive portion of the capacitive elements includes an effective parallel resistance representing the dielectric losses. The parallel resistance causes the capacitor to continue to draw current after it has been fully charged and may alter the final value of voltage to which it charges. The resistive portion also includes an effective series resistances, often from contact losses, which increase the charging time constant of the capacitor. Thus, the losses attendant to a measured capacitor plus the stray capacitance and inductance in the measuring circuit have complicated the measurement of the capacitance. The resistances in the branches of the bridge network are related to the capacitive element such that the charging current flowing in one-half of a switching cycle equals the current defined by the resistive network flowing during the opposite half of the same cycle. The galvanometer is thereby adjusted to a zero or null reading. The operation of the circuit in accordance with the present invention in a monitoring system, control system or the like, which depends on the variation in the value, requires only that the circuit can be zeroed rather than a precise knowledge of the particular value of the unknown capacitance at the zero or set point condition.

The absorption losses associated with the resistance components of the condition-sensitive capacitance transducer are compensated for by selecting a proper operating frequency and the proper resistances in the legs of the bridge.

When a capacitance change occurs in the condition-sensitive capacitance transducer, the charging current will change and will no longer be equal to the normal resistive current. This will result in a galvanometer deflection which will be proportional to the change in capacitance. Tests have been made for capacitance changes in excess of a 10 to 1 ratio with a maximum resulting linearity deviation of 1.5 percent.

A transistorized switching circuit has been employed utilizing a crystal-controlled oscillator to provide a reliable and long-life switching circuit which is frequency stable. The switching circuit includes a first transistor connected in series with a capacitor in one leg of the bridge for charging and a second transistor connected in parallel for discharging of the capacitor.

Generally, the sensitive capacitive transducer should fully charge during the charging half-cycle. This requires that the duration of the charging half-cycle should exceed or be of the order of five of the capacitive charging time constants.

BRIEF DESCRIPTION OF THE DRAWING

The drawing furnished herewith illustrates the best mode presently contemplated by the inventors and clearly discloses the above advantages and features as well as others which will be readily understood from the detailed description thereof.

In the drawing.

DESCRIPTION OF THE PREFERRED ILLUSTRATED EMBODIMENT

Figure 1:
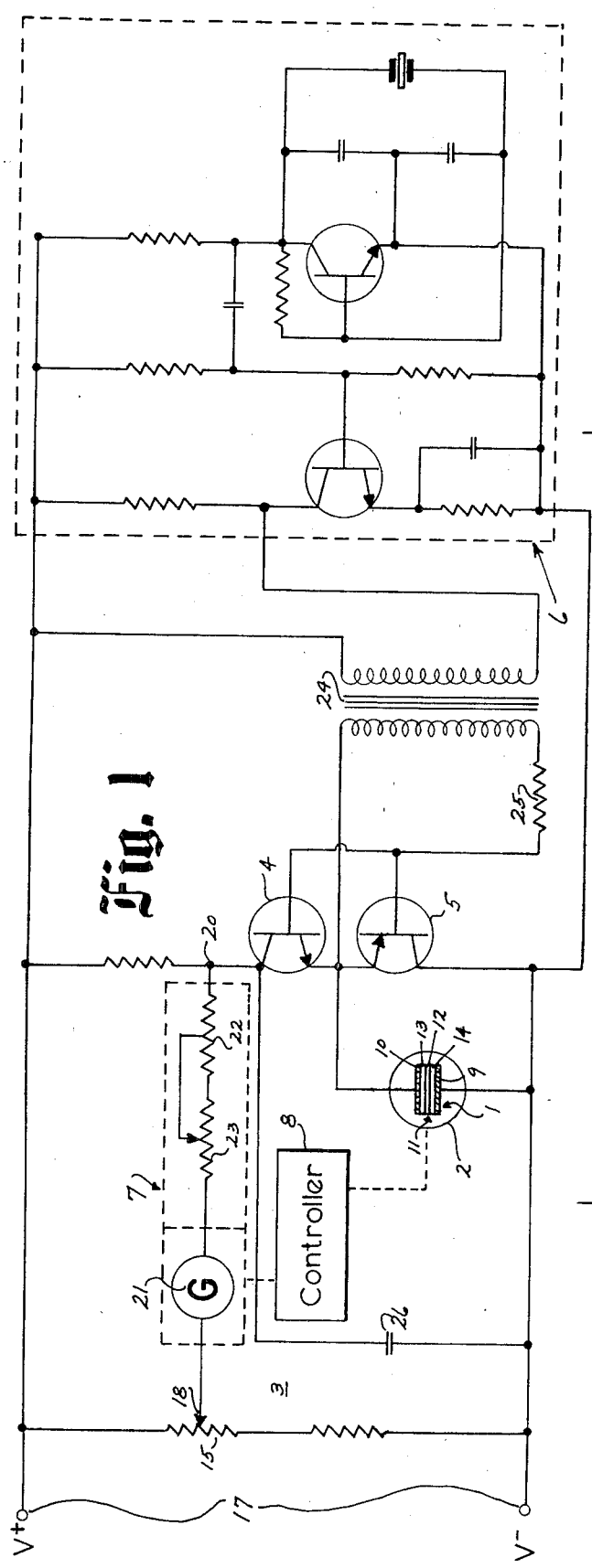
FIG. 1 is a schematic view of a capacitance-sensitive apparatus, including a condition-sensitive capacitive transducer.

Referring to the drawing and particularly FIG. 1, the illustrated embodiment of the invention includes a condition-sensitive capacitive sensor or transducer 1 mounted within an enclosure 2, the condition of which is to be monitored or controlled.

The sensor many be of any capacitive construction which produces a change in its capacitance in response to the change in the condition being monitored. The present invention is particularly adapted to a humidity control system for controlling the environmental humidity within a room or other enclosure with the humidity continuously sensed by a sensor 1 constructed in accordance with the teaching of U.S. Pat. No. 3,350,941 to Misevich and Sullivan. The illustrated embodiment of the invention is therefore described with such a novel system.

The capacitive sensor 1 is connected in one leg of Maxwell-type DC bridge network 3. The sensor 1 is selectively connected into and removed from the network 3 by a pair of electronic switching elements 4 and 5 which are alternately and oppositely turned on and off by a high-frequency signal source 6. Elements 4 and 5 are illustrated as transistors connected respectively in series and in parallel with the capacitive sensor 1. When transistor 4 conducts, the sensor 1 receives charging current from the network 3. When transistor 5 conducts, the sensor 1 discharges rapidly through the transistor 5. This establishes a related pulsating DC current in network 3 which includes a readout 7 to indicate the particular value of the capacitance. The readout 7, in accordance with one aspect of the present invention, creates a signal for a control system which is connected to actuate a controller 8 for holding of the condition surrounding the sensor at a predetermined state. Thus, the humidity sensor 1 originates a control signal proportional to the humidity. The signal is processed through any suitable loop to control the humidity of the environment within the enclosure 2.

As previously noted, humidity sensor 1 is preferably constructed as taught in U.S. Pat. No. 3,350,941 and includes a pair of spaced electrodes or plates 9 and 10 with the intermediate dielectric 11 including a central core of a moisture insensitive, dielectric material 12 and outer layers 13 and 14 of a moisture sensitive, dielectric material. The outer layers significantly absorb moisture to produce a rapid and accurate response to humidity changes. Although the central core may also absorb moisture, the percentage is significantly lower. The capacitive sensor of this construction minimizes the resistive components inserted in the circuit, and applicants have found that the invention permits circuit component selection to essentially compensate for any such resistive components such that the commutated bridge and the like provides a highly reliable and accurate output which is proportional to the variation in capacitance and thereby the humidity condition to which the capacitive sensor is subjected, as hereinafter described. This permits the use of the bridge in instrumentation and control systems.

More particularly, the bridge circuit or network includes four legs in accordance with known construction. An adjustable resistor 15 is connected in series with a fixed resistor 16 across the DC source 17. The resistor 15 includes a movable tap 18 defining one output point which is connected to the readout 7. A fixed resistor 19 is connected in series with the transistor 4 and the sensor 1 across the DC source 17. The junction 20 of the fixed resistor 19 and the transistor 4 defines the second output junction or terminal of the bridge network 3 and is connected to the opposite side of the readout 7.

The illustrated readout 7 is shown including a galvanometer 21 in series with a fixed resistor 22 and an adjustable resistor 23 to permit adjustment of the galvanometer reading span; i.e., the capacitance change required to produce full scale deflection. Thus, the range or span of operation and hence the variance in capacitance capable of being measured for a given balanced condition can be adjusted by varying resistor 23. Increasing the value of resistor 23 decreases the amount of current passing through the galvanometer 21 and a subsequent smaller metal deflection will occur. Thus, a larger change in capacitance may be sensed. The opposite result will occur if the value of the resistor 23 is decreased.

The various in the value of capacitive transducer 1 is determined by periodically charging and discharging thereof by alternately turning the transistors 4 and 5 on and off. The transistor 4 is shown as an NPN-transistor having the emitter to collector circuit connected in series with the capacitive sensor 1 to define the leg of the bridge. The base to emitter circuit of the transistor is connected to the high-frequency source 6 by a transformer 24. A limiting resistor 25 is connected in the base lead.

The second transistor 5 is shown as a PNP-transistor having the emitter to collector circuit connected in parallel with the capacitive sensor 1 and in series with the emitter to collector of NPN-transistor. The emitters of the transistors are connected to each other and to a common side of the transformer 24. The base of the transistor 5 is also connected to the opposite side of the transformer 24 through the limiting resistor 25.

As a result of the complementary structure of the transistors, the signal from the high-frequency signal source 6 biases one transistor on and the other transistor off.

The high-frequency source may be any suitable means providing alternately oppositely polarized voltage, preferably of a square waveform to produce precise turn on and off of the transistor switches or other similarly controlled switches. A highly satisfactory source is a transistorized crystal oscillator employing a crystal to establish a highly stable frequency output. The oscillator may be any well-known or desired construction and is therefore shown in block diagram. The output of the crystal oscillator biases transistor 4 to conduct during one half-cycle and the second transistor 5 to conduct during the opposite half-cycle with the switching occurring at an essentially constant frequency. The transistors 4 and 5 are thereby driven between a complete cutoff and saturation level to produce complete switching. The transistors ideally produce a zero resistance when conducting and an infinite impedance or open circuit when cut off. In fact, the usual transistors are never ideal. The circuit performance may be enhanced by use of field effect transistors which have a more distinct "on" and "off" status.

Applicants have found the optimum results are obtained by establishing a switching period of sufficient low frequency which just allows the capacitive sensor to fully charge during the charging half-cycle. This generally requires that the charging cycle be at least of the order of five charging time constants, which can be readily determined experimentally or by calculation. The sensitivity of the circuit is generally inversely proportional to the charging period, and the period should allow complete charging but should not be increased beyond such points.

The particular frequency of switching may be at or below the low-frequency range of available crystal oscillators. Furthermore, low-frequency crystal oscillators are reactively expensive in comparison to high-frequency crystal oscillators of 100 thousand Hertz (kHz.) and above, which are mass produced for use in broadcast receivers. However, the requirement of full capacitor charging would normally prevent use of the high-frequency oscillators. In accordance with a further aspect of the present invention, a storage capacitor 26 is connected across the collectors of the transistors and thus across the capacitive sensor 1 in series with the charging transistor 4.

The charge reservoir capacitor 26 draws a driving charge over the full switching cycle and allows the condition sensitive capacitance transducer 1 to fully charge in a shorter period of time. The addition of charge reservoir capacitor 26 allows the system to operate at a slightly higher frequency than would otherwise be possible thus enabling the employment of such standard high-frequency crystal oscillators.

A capacitor, not shown, in parallel with the resistor 19 would give the same result. With the condition-sensitive capacitance transducer 4 completely discharged, the first mode of a switching cycle begins when the crystal oscillator 6 turns on transistor 4 and turns off transistor 5. The capacitive transducer 1 is thereby connected to the resistive legs of the bridge circuit 3. Transistor 5 ideally produces an essentially infinite impedance or open circuit between its emitter and collector terminals and thus opens the discharge path for capacitive sensor 1. Current passes through the resistive arms of the bridge circuit and the capacitive sensor 1 with the current level proportional to the bridge unbalance. The bridge unbalance in turn is dependent directly on the capacitance of the condition-sensitive capacitance transducer 1, and therefore the humidity within the enclosure. As the condition-sensitive capacitance transducer 1 charges, current flows through the galvanometer 21 from a left to right direction, as shown in the drawing. As the condition-sensitive capacitance transducer 1 becomes charged, the charging current flowing through the galvanometer 21 decreases and becomes zero or nearly zero when the condition-sensitive capacitance transducer 1 is fully charged. Thus, a steady-state condition exists and the current flowing through galvanometer 21 will be in a right to left direction defined by the resistive network composed of resistors 15, 19 and 16 and the readout resistors 22 and 23.

After the condition-sensitive capacitance transducer 1 is fully charged, the second mode of the switching cycle begins when the crystal oscillator 6 turns off transistor 4 thereby disconnecting the condition-sensitive capacitance transducer 1 from the bridge arrangement and turns on transistor 5 which provides and completes a low impedance discharge path for the condition-sensitive capacitance transducer 1. The removal of the condition-sensitive capacitance transducer 1 from the bridge arrangement at the start of the second mode of the switching cycle will have no effect on the current flowing through the galvanometer 21. This result occurs because the the condition-sensitive capacitance transducer 1 was fully charged before it was removed and the current flowing through the galvanometer 21 will continue to be defined by the resistive network composed of resistors 15, 16, 19, 22 and 23. The condition-sensitive capacitance transducer 1 discharges rapidly and completely through the parallel transistor which introduces a slight resistance to dissipate the energy. The condition-sensitive capacitive transducer 1 is completely discharged, after which the oscillator recycles the switching transistor and reinstates the first mode of the switching cycle.

The galvanometer reading or indication movement is connected to establish a corresponding control signal which is applied to the controller for readjusting the humidity within the enclosure to maintain the condition at a selected level.

By switching at a sufficiently rapid rate, the inertia of a typical galvanometer damps the movement of the pointer and associated signal means as the current flows in opposite directions and thereby establishes an output indication and signal which is the average of the two currents. In initially establishing or zeroing the network, the frequency of the switching cycle and the values of the bridge resistors 15, 16 and 19 are selected and tap 18 adjusted such that the amount of current defined by the steady-state resistive network flowing during one switching cycle equals the amount of charging current flowing during the same switching cycle. The bridge arrangement is then balanced and the galvanometer 5 will indicate a zero or null current reading. In order to obtain an initial balanced condition design, the meter or sensing device is selected such that the source and meter resistances are practically zero and the elements of the bridge generally selected according to the known formula $c=(R_{15})/f R_{16}R_{19}$ for a nonabsorptive capacitor to establish an approximate circuit from which adjustment is made, preferably by a trial and error sequence to obtain the desired balance. In the above equation, $R_{15}$ is the resistance above tap 18 in the drawing, and $R_{16}$ includes the resistance of resistor 15 below tap 18. In particular, the resistors are particularly selected to permit the use of this equation. Thus, the source and the meter are assumed to have a zero resistance. With careful circuit design, this assumption is reasonably attainable. Further, the resistances are selected such that the square of the resistance of resistor 18 is much less than the product of the resistance of resistors 19 and 16. If the resistance of 16 is much greater than that of 19, this approximation is still closer to that of the actual equation. Further, the largest capacitance to be measured is employed in determining the maximum allowable frequency which is limited by the equation $f \leq (1)/(10R_cC_1)$ which represents the upper limit of the drive frequency, where the resistance ($R_c$) across the bridge terminals to the capacitor leg is derived from Thevenin's Theorem. Thus, the frequency must be sufficiently low to permit charging to within about 1 percent of the final value which generally requires five time constants. The necessary equations can be derived and the series and parallel resistances of the sensor determined therefrom as shown in a paper of the inventor John C. Donovan published in "IEEE Transactions on Industrial Electronics and Control Instrumentation," July, 1969. Further, the transistor switches introduce similar resistances. The charging transistor in the "on" state includes a small series resistance and thus must be added to the transducer contact resistance. The discharging transistor in the "off" state has some leakage which is added to the parallel transducer resistance. Thus, the transducer or sensor has a contact resistance which appears as a series resistance and a dielectric loss which appears as a parallel resistance, which applicants have found can be separately considered, and further that parallel resistance is treated as a "short shunt" resistance appearing directly across the sensing capacitive transducer. However, the equations are extremely complex and the required adjustment relatively minor and readily established such that the direct physical adjustment may be conveniently made by the operator, installer, or the like.

Figure 2:
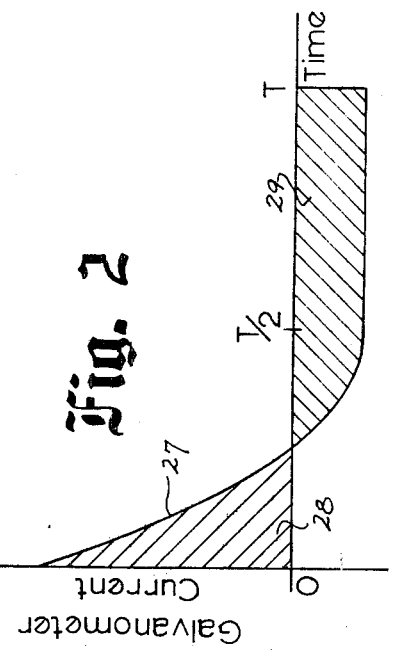
FIG. 2 is a typical graphical illustration of a galvanometer current in a balanced Maxwell bridge for a given capacitance of a condition-sensitive capacitive transducer.

FIG. 2 shows a graphic illustration of the current waveform indicated by line 27 flowing through the galvanometer 21 during one complete switching cycle with a balanced bridge arrangement. The ordinate represents the galvanometer current while the abscissa indicates time. When the bridge arrangement is balanced so that the galvanometer 21 indicates a zero current, the area enclosed by the current waveform 27 above the abscissa shown by shaped area 28 will equal the area enclosed by the current waveform 27 below the abscissa shown by the shaded area 29.

The attendant losses attributed to the condition-sensitive capacitance transducer 1 are directly compensated to give a correct reading. The loss characterized as a series resistance will increase the time constant of the charging operation which will slightly increase the area enclosed by the current waveform above the abscissa shown by shaded area 28 in FIG. 2. A simple adjustment of resistors 15, 16 and 19 will compensate for this loss by increasing he resistive current flowing through galvanometer 21 and hence will balance the circuit. The loss characterized as a parallel resistance will cause the condition-sensitive capacitance transducer 1 to continue to draw current after it has fully charged. This can also be compensated by adjusting resistors 15, 16 and 19 to produce an equivalent but opposite current flowing through the galvanometer 21.

Figure 3:
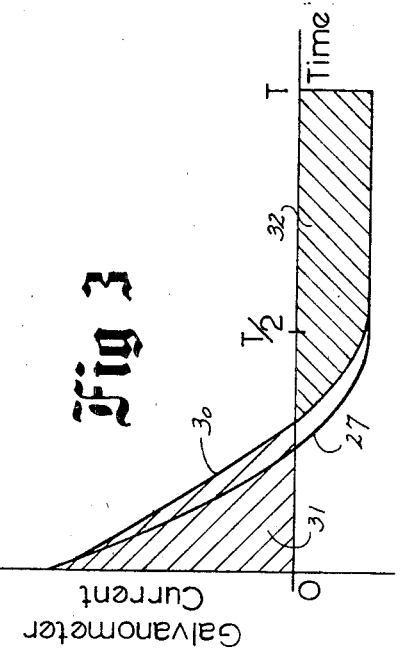
FIG. 3 is a similar graphical illustration of the galvanometer current change resulting from a given change in the capacitance of the condition-sensitive capacitive transducer.

If the capacitance of the condition-sensitive capacitance transducer 1 changes, the charging current to fully charge the condition-sensitive capacitance transducer 1 also changes with a corresponding change in the charging time. The current waveform impressed on the output circuit for an increased capacitance is typically such as that shown by line 30 in FIG. 3. The area enclosed by the current waveform 30 above the abscissa shown by shaded area 31 will not equal the area enclosed below the abscissa by current waveform 30 shown by shaded area 32. The bridge arrangement will then be unbalanced since the current utilized for charging will not equal the steady-state current defined by the resistive arms of the bridge circuit. The averaging function of galvanometer 21 will then indicate the change of the charging current which will be proportional the change in capacitance of the condition-sensitive capacitance transducer. The current waveform 27 in FIG. 3 indicates the balanced condition and corresponds to current waveform 27 shown in FIG. 2.

It is possible to balance the bridge for the maximum anticipated value of capacitance and measure decreases in capacitance, or to balance the bridge for the minimum anticipated capacitance and measure increases in capacitance, or to operate from any desired starting point on the galvanometer 21 scale. In either design however, the largest anticipated capacitance must be considered in selecting or establishing the circuit components in order to establish the desired charging and discharging cycles. The function of the current sensing galvanometer 21 could also be performed by using a suitable voltage sensitive instrument connected across resistor 23 or the like to sense the voltage across the portion of resistor 23 in the circuit. The voltage is proportional to the current and thus provides a similar proportional signal.

Either signal may be connected into an appropriate control network to produce an error signal proportional to the deviation of the humidity from a desired set point. The error signal is applied to the controller which in turn increases or reduces the humidity through any suitable operator to return the humidity to the set point and thereby rebalance the network to the null output.

The present invention thus provides a highly satisfactory and reliable capacitive sensing and control system for measuring and continually indicating the changes in capacitance and responding to such changes that occur in a condition-sensitive capacitance sensor or transducer.

Various modes of carrying out the invention are contemplated as being within the scope of the following claims which particularly point out and distinctly claim the subject matter which is regarded as the invention.

We claim:

1. Apparatus for continuously measuring and indicating the change in a capacitive element, comprising direct current input means, a condition-sensitive capacitive transducer having dielectric material, the electrical and dielectric characteristic of said transducer varying with said condition, a low impedance discharge path means, a switching means selectively connecting the transducer to the input means to establish a charging circuit and in said low impedance discharge path means to establish a discharging circuit, said dielectric material having an effective resistive component, said charging circuit of said capacitive transducer including compensating resistive elements essentially balancing and cancelling the effective resistive component effect on the charging current, and sensing means connected to said charging circuit for sensing changes in charging energy which are proportional to corresponding changes in capacitance with said transducer connected to said input means to thereby detect said condition.

2. The apparatus of claim 1, having a charge reservoir element connected to said input means in parallel with said condition-sensitive capacitive transducer and said switching means, said condition-sensitive capacitive transducer receiving electrical charges from said charge reservoir element in parallel with said input means with said switching means connecting said transducer to said input means to rapidly charge the transducer.

3. The apparatus of claim 2, wherein said switching device includes a pair of solid-state devices, a crystal-controlled electrical oscillating device connected to alternately turn on each of said pair of devices, one of said solid-state devices alternately connects and disconnects said condition-sensitive capacitive transducer from said input means and the other of said solid-state devices being connected in parallel with said transducer and defining said low impedance discharge path means.

4. The apparatus of claim 1, wherein said capacitive transducer forms a leg of a Maxwell commutated direct current bridge having three other legs of resistive elements including adjustable resistive elements.

5. The bridge apparatus of claim 4, having said sensing means connected across the output of the bridge for sensing proportional average cyclic charging current and resistive current, said resistive elements having a predetermined resistance to establish said charging and resistive currents equal upon a balanced condition, said charging and resistive currents being unequal for an unbalanced condition in accordance with a change in the capacitance of said condition-sensitive capacitive transducer, said sensing means establishing a null signal in response to said balanced condition and a proportional signal in accordance with a capacitance change as a result of the corresponding current changes.

6. The bridge apparatus of claim 5, wherein a span adjustment device is connected in electrical series with the sensing means, said span adjustment device comprising an adjustable resistive element, said adjustable resistive element limiting the amount of said charging and resistive currents permitted to be sensed by the sensing means.

7. The apparatus of claim 1, having a commutated direct bridge current including a plurality of bridge legs, said capacitive transducer being selectively connected in one leg of said commutated direct current bridge by said switching means, said bridge have three other legs of resistive elements including adjustable resistive elements.

8. The apparatus of claim 7, wherein said electrical and condition-sensitive capacitive transducer is a humidity-sensing device having an absorptive dielectric material with the electrical and dielectric characteristic varying with humidity, said switching means including a solid-state switching element connected in series with the transducer in said one leg and a second solid-state state switching element connected in parallel with said capacitive transducer, and alternating polarity power means connected to said switching elements to alternately turn said elements on and off at a selected frequency having said first element on for a sufficient period to fully charge the transducer for a selected maximum capacitance sensed condition.

9. The apparatus of claim 8, wherein said sensing means includes a current-sensitive metering means connected across the output of the bridge for sensing proportional average cyclic charging and resistive currents, a humidity controller connected to said metering means and having an output to control the humidity environment about said transducer.

10. The bridge apparatus of claim 8, wherein said sensing means includes a current-sensitive meter, a span adjustment resistor connected in electrical series with said meter across the output of the bridge, said adjustable resistive elements of said other legs limiting the amount of said charging and resistive currents permitted to be sensed by the sensing means.

11 The apparatus of claim 8, having a capacitor connected in parallel with said condition-sensitive capacitive transducer and first solid-state switching element and establishing an electrical charge source to rapidly charge the transducer within the charging period.

12. The apparatus of claim 8, wherein said power means includes a high-frequency crystal oscillator.

13. The apparatus of claim 8, wherein said switching elements are transistors alternately connecting and disconnecting said condition-sensitive capacitive transducer from said bridge apparatus, and said power means includes a high-frequency crystal-controlled electrical oscillator.

14. The apparatus of claim 1, wherein the transducer is connected in said charging circuit for a period essentially corresponding to the period to fully charge the transducer for a selected maximum condition established capacitance.

* * * * *

UNITED STATES PATENT OFFICE
CERTIFICATE OF CORRECTION

Patent No. 3,636,444          Dated January 18, 1972

Inventor(s) CHARLES F. STRAWN and JOHN C. DONOVAN

It is certified that error appears in the above-identified patent and that said Letters Patent are hereby corrected as shown below:

| | | | |
|---|---|---|---|
| Column 3, | line 52, | cancel "metal" and insert --- meter ---; | |
| Column 3, | line 55, | cancel "various" and insert --- variation ---; | |
| Column 4, | line 32, | cancel "reactively" and insert --- relatively ---; | |
| Column 6, | line 51, | after "proportional" insert --- to ---; | |
| Column 8, (Claim 7) | line 11, | cancel "bridge current" and insert --- current bridge ---; | |
| Column 8, (Claim 8) | line 16, | cancel "electrical and"; | |
| Column 8, (Claim 8) | line 22, | before "switching" cancel "state" (second occurrence); | |
| Column 8, (Claim 11) | line 43, | before "first" insert --- said ---. | |

Signed and sealed this 12th day of September 1972.

(SEAL)
Attest:

EDWARD M. FLETCHER, JR.
Attesting Officer

ROBERT GOTTSCHALK
Commissioner of Patents